US012654301B2

(12) United States Patent　　　　　(10) Patent No.:　US 12,654,301 B2

Hurka　　　　　　　　　　　　　　　　　(45) Date of Patent:　Jun. 16, 2026

(54) ELECTRIC HAND-HELD POWER TOOL

(71) Applicant: Hilti Aktiengesellschaft, Schaan (LI)

(72) Inventor: Florian Hurka, Margertshausen (DE)

(73) Assignee: Hilti Aktiengesellschaft, Schaan (LI)

( * ) Notice: Subject to any disclaimer, the term of this patent is extended or adjusted under 35 U.S.C. 154(b) by 186 days.

(21) Appl. No.: 18/565,435

(22) PCT Filed: May 31, 2022

(86) PCT No.: PCT/EP2022/064704

§ 371 (c)(1),
(2) Date: Nov. 29, 2023

(87) PCT Pub. No.: WO2022/263164

PCT Pub. Date: Dec. 22, 2022

(65) Prior Publication Data

US 2024/0253202 A1　　　Aug. 1, 2024

(30) Foreign Application Priority Data

Jun. 14, 2021　　(EP) ..................................... 21179224

(51) Int. Cl.
B25F 5/00　　　　(2006.01)
H02K 7/14　　　　(2006.01)
H02P 21/22　　　　(2016.01)

(52) U.S. Cl.
CPC ............... B25F 5/00 (2013.01); H02K 7/145 (2013.01); H02P 21/22 (2016.02)

(58) Field of Classification Search
CPC .. B25F 5/00; H02K 7/14; H02K 7/145; H02P 21/22
See application file for complete search history.

(56) References Cited

FOREIGN PATENT DOCUMENTS

DE　　102008042978 A1　　4/2010
EP　　　2760124 A2　　7/2014

OTHER PUBLICATIONS

International Search Report PCT/EP2022/064704 dated Oct. 6, 2022.

*Primary Examiner* — Tulsidas C Patel
*Assistant Examiner* — Joshua Kiel M Rodriguez
(74) *Attorney, Agent, or Firm* — Davidson Kappel LLC

(57)　　　　ABSTRACT

An electric hand-held power tool, having a brushless DC motor and a control unit for field-oriented control of the DC motor on the basis of a current request signal and a target voltage value derived from the current request signal, wherein the hand-held power tool is further designed to provide a system voltage to supply the DC motor, wherein the control unit is set up to adjust the current request signal taking into account a voltage difference between the system voltage and the target voltage value.

14 Claims, 1 Drawing Sheet

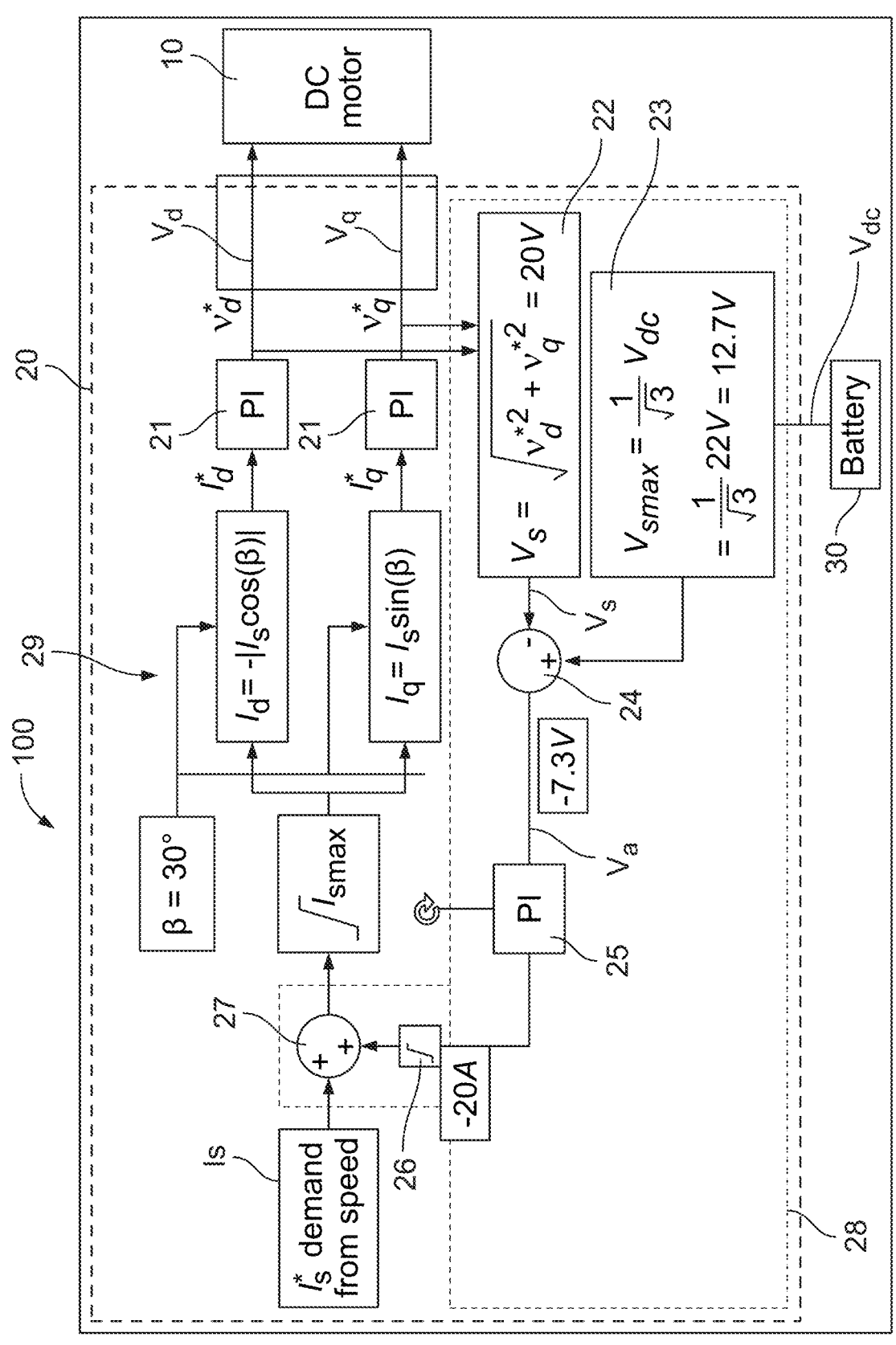

ELECTRIC HAND-HELD POWER TOOL

The present invention relates to an electric hand-held power tool having a brushless DC motor and a control unit for field-oriented control of the DC motor on the basis of a current request signal and a target voltage value derived from the current request signal. The hand-held power tool is designed to provide a system voltage to supply the brushless DC motor.

BACKGROUND

Hand-held power tools of the type mentioned at the beginning are known in principle from the prior art. The d/q transformation as a space vector representation has proven itself for the design of such field-oriented control processes. Accordingly, the d/q transformation is used to describe the present invention.

SUMMARY OF THE INVENTION

It is an object of the present invention to specify an electric hand-held power tool that provides a basis for improved speed control of the brushless DC motor.

The present invention provides that the control unit is set up to adjust the current request signal taking into account a voltage difference between the system voltage and the target voltage value.

The invention includes the knowledge that with field-oriented control processes at the voltage limit, that is to say when the maximum system voltage that can be provided is identical to or even higher than the target voltage value, so-called wind-up effects can occur in the typically provided integral component of the control unit. Due to the fact that the control unit can no longer impress the current into the windings of the brushless DC motor due to the high back-induced voltage, any residual faults that can no longer be corrected in reality are integrated in the integral component of the control unit. When the voltage limit is departed, this leads to an undesirable, delayed behavior of the brushless DC motor.

The fact that the control unit is set up to adapt the current request signal on the basis of a voltage difference between the system voltage and the target voltage value creates the basis for avoiding the wind-up effect. In particular, when designing the controller, the use of certain motor parameters that would require a measurement of the brushless DC motor can be omitted. It has proven to be advantageous if the voltage difference is calculated by a difference block included in the control unit.

In a particularly preferred configuration, the control unit is set up to take into account the voltage difference in a variable manner. In other words: the control unit is set up, in particular, so that in any case no constant value is used for the adjustment of the current request signal for large voltage differences that are different in terms of absolute value and are greater than zero. This favors particularly optimum-performance control of the brushless DC motor.

In a particularly preferred configuration, the control unit is set up to take into account the system voltage and/or the target voltage value in transformed form. It has proven to be advantageous if the target voltage value is formed as the square root of the sum of the squares of the d target voltage value and the q target voltage value (d/q transformation). This can be done, for example, by means of a target transformation block included in the control unit. It has also proven to be advantageous if the system voltage is taken into account with the factor of $1/\sqrt{3}$ (3-phase system). This is preferably done by means of a system transformation block included in the control unit.

In a particularly preferred configuration, the control unit is set up to amplify the voltage difference, in particular by means of a PI controller (proportional-integral controller). It has proven to be advantageous if the control unit is set up to adjust the current request signal only by way of a negative manipulated variable which directly or indirectly represents the voltage difference. It has proven to be advantageous if the control unit has a limiting block for this purpose. The current request signal can be adapted by an adding block included in the control unit.

In another particularly preferred configuration, the control unit is set up to ascertain the target voltage values between a current controller of the control unit and the brushless DC motor. This has the advantage that the use of certain motor parameters that would require a complex measurement of the brushless DC motor can be omitted.

In a particularly preferred configuration, the system voltage is provided by means of a rechargeable battery pack. It has proven to be advantageous if the system voltage is preferably between 12 and 36 volts, in particular 12 volts, 22 volts or 36 volts. The system voltage can correspond to the open circuit voltage of the rechargeable battery pack.

It has proven to be advantageous if the control unit is set up to adjust the current request signal exclusively taking into account a voltage difference between the system voltage and the target voltage value.

Further advantages will become apparent from the following description of the FIGURES. A particularly preferred exemplary embodiment of the present invention is depicted in the FIGURE.

The FIGURES, the description and the claims contain numerous features in combination.

A person skilled in the art will expediently also consider the features individually and combine them to form useful further combinations.

BRIEF DESCRIPTION OF THE DRAWINGS

Identical and similar components are denoted by the same reference signs in the FIGURE, in which:

FIG. 1 shows a preferred exemplary embodiment of an electric hand-held power tool.

DETAILED DESCRIPTION

FIG. 1 shows—in a highly schematic illustration—an electric hand-held power tool 100.

The hand-held power tool 100, schematically here a cordless screwdriver, is equipped with a brushless DC motor 10. The hand-held power tool 100 is further designed to provide a system voltage $V_{dc}$ to supply the DC motor 10. This is done using a rechargeable battery pack 30 which has a supply voltage of 22 volts, for example.

The hand-held power tool 100 is also equipped with a control unit 20 for field-oriented control of the DC motor 10. As can be seen from FIG. 1, the control unit 20 is shown after d/q transformation. Based on a current request signal $I_S$, which may originate, for example, from a speed controller not illustrated here, target voltage values $V_d$, $V_q$ for the brushless DC motor 10 are derived in a feedforward branch 29 (in a manner known from the prior art). The target voltage values $V_d$, $V_q$ each originate from a current controller 21 included in the control unit 20. The current controllers 21 are designed as PI controllers, for example. Instead of a PI controller, the current controller 21 may also be a PID controller (proportional-integral-derivative controller) consisting of the components of a P element, an I element and a D element.

The control unit 20 has a feedback branch 28, which is identified in FIG. 1 by a dotted box. The control unit 20 is set up to ascertain the target voltage values $V_d$, $V_q$ between a current controller 29 of the control unit 20 and the DC motor 10. Then the target voltage values $V_d$, $V_q$ are first led to a target transformation block 22 in order to take into account these values in transformed form. In the target transformation block 22, a transformed target voltage value $V_S$ is formed as the square root of the sum of the squares of d-target voltage value $V_d$ and q-target voltage value $V_q$.

The control unit 20 also has a system transformation block 23 in which the system voltage $V_{dc}$ provided by the rechargeable battery pack 30 of 22 volts, for example, is transformed into a transformed system voltage value $V_{Smax}$. This is done by multiplying the system voltage $V_{dc}$ by the factor $1/\sqrt{3}$ (3-phase system). The transformed system voltage value $V_{Smax}$ is that phase voltage which is actually available as a maximum for the brushless DC motor 10, that is to say downstream of the current controllers 21. In the present example, this is 12.7 volts.

According to an alternative embodiment, the hand-held power tool 100 does not have a rechargeable battery pack 30 as energy supply. In this case, the hand-held power tool 100 is designed with a power cable in order to connect the hand-held power tool 100 to a mains voltage for supplying electrical energy. The provided system voltage $V_{dc}$ can be detected by a mains voltage in the link circuit if the hand-held power tool 100 is supplied with electrical energy.

In the case of hand-held power tools 100 without a rechargeable battery pack 30 and with a power cable, the system voltage $V_{dc}$ can also be generated by a rectified link circuit voltage and/or a link circuit voltage optimized via a PFC.

The control unit 20 is set up to adjust the current request signal $I_S$ taking into account a voltage difference $V_A$ between the system voltage $V_{dc}$ and the target voltage value $V_d$, $V_q$. In the exemplary embodiment in FIG. 1, the transformed target voltage value $V_S$ is subtracted from the transformed system voltage value $V_{Smax}$ in a difference block 24 in order to form a voltage difference $V_A$. In the exemplary embodiment presented here, due to the instantaneous current request signal $I_S$, a transformed target voltage value $V_S$ of 20 volts downstream of the current controllers 21 is requested. Since only 12.7 volts can be provided in the present example, the difference block 24 ascertains a voltage difference $V_A$ of −7.3 volts. This voltage difference is fed via a PI controller 25 with an amplifying effect to a limiting block 26 which is set up to adjust the current request signal $I_S$ only by way of a negative manipulated variable. Accordingly, the control unit 20 has an adding block 27. The current request signal $I_S$ is in this case adjusted downward by 20 amperes, for example.

The described feedback branch 28 takes into account the voltage difference $V_A$ in a variable manner (and not substituted by a constant equivalent voltage which is independent of a specific value of the voltage difference $V_A$.)

FIG. 1 shows that the higher the target voltage value $V_S$ corresponding to the respective current request signal $I_S$, the higher also the voltage difference $V_A$. This "degree of overvoltage" is amplified by the PI controller 25 and—it is a negative value—is subtracted from the current request signal $I_S$ in the adding block 27. As a result, a current requirement becomes smaller. A smaller voltage difference $V_A$ results for the next control cycle of the control unit. The control unit runs through this process until the voltage difference $V_A$ is 0 volts and the target voltage values $V_d$, $V_q$ caused by the current request signal $I_S$ are in this case 12.7 volts, for example.

As can also be seen from FIG. 1, the control unit 20 is set up to adjust the current request signal $I_S$ exclusively taking into account a voltage difference $V_A$ between the system voltage $V_{dc}$ and the target voltage value $V_d$, $V_q$. In other words, the adding block 27 has only two inputs.

LIST OF REFERENCE SIGNS

10 Brushless DC motor
20 Control unit
21 Current controller
22 Target transformation block
23 System transformation block
24 Difference block
25 PI controller
26 Limiting block
27 Adding block
28 Feedback branch
29 Feedforward branch
30 Rechargeable battery pack
100 Electric hand-held power tool
$I_S$ Current request signal
$V_A$ Voltage difference
$V_d$ Target voltage value
$V_{dc}$ System voltage
$V_q$ Target voltage value
$V_S$ Transformed target voltage value
$V_{Smax}$ Transformed system voltage value

What is claimed is:

1. An electric hand-held power tool comprising:
a brushless DC motor; and
a controller for field-oriented control of the DC motor on the basis of a current request signal and a target voltage value derived from the current request signal, a system voltage supplying the DC motor;
the controller set up to adjust the current request signal taking into account a voltage difference between the system voltage and the target voltage value;
the controller further set up to adjust the current request signal only by way of a negative manipulated variable directly or indirectly representing the voltage difference.

2. The hand-held power tool as recited in claim 1 wherein the controller is set up to take into account the voltage difference in a variable manner.

3. The hand-held power tool as recited in claim 2 wherein the controller is set up to take into account the system voltage or the target voltage value in transformed form.

4. The hand-held power tool as recited in claim 2 wherein the system voltage value is a transformed system voltage value formed in a system transformation block by multiplying a non-transformed system voltage by a factor $1/\sqrt{3}$.

5. The hand-held power tool as recited in claim 4 wherein the transformed target voltage value is subtracted from the transformed system voltage value in a difference block in order to form the voltage difference, the negative manipulated variable causing the current request signal to become smaller via an adding block.

6. The hand-held power tool as recited in claim 1 wherein the controller is set up to amplify the voltage difference.

7. The hand-held power tool as recited in claim 6 wherein the controller amplifies the voltage difference via a PI controller.

8. The hand-held power tool as recited in claim 1 wherein the controller is set up to ascertain the target voltage values between a current controller of the controller and the DC motor.

9. The hand-held power tool as recited in claim 1 wherein the controller is set up to adjust the current request signal exclusively taking into account a voltage difference between the system voltage and the target voltage value.

10. The hand-held power tool as recited in claim 9 wherein the system voltage is between 12 and 36 volts.

11. The hand-held power tool as recited in claim 1 wherein the system voltage is provided via a rechargeable battery pack.

12. The hand-held power tool as recited in claim 1 wherein the hand-held power tool is designed as a cordless screwdriver.

13. The hand-held power tool as recited in claim 1 wherein the target voltage value is a transformed target voltage value formed in a target transformation block as a square root of a sum of squares of non-transformed target voltage values.

14. The hand-held power tool as recited in claim 1 wherein the system voltage value is a transformed system voltage value formed in a system transformation block by multiplying a non-transformed system voltage by a factor $1/\sqrt{3}$.

* * * * *